(12) United States Patent
Verdier

(10) Patent No.: US 11,808,336 B1
(45) Date of Patent: Nov. 7, 2023

(54) TORQUE CONVERTER DAMPER ASSEMBLY

(71) Applicant: Schaeffler Technologies AG & Co. KG, Herzogenaurach (DE)

(72) Inventor: Joshua Verdier, Lodi, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/984,327

(22) Filed: Nov. 10, 2022

(51) Int. Cl.
*F16H 45/02* (2006.01)

(52) U.S. Cl.
CPC ..... *F16H 45/02* (2013.01); *F16H 2045/0231* (2013.01)

(58) Field of Classification Search
CPC ............... F16F 15/12352–15/12373; F16F 15/13469–15/13492; F16H 2045/0231; F16H 2045/0221; F16H 2045/0226
USPC ....................................... 464/68.8; 192/213.2
See application file for complete search history.

(56) References Cited

U.S. PATENT DOCUMENTS

| | | | | |
|---|---|---|---|---|
| 2012/0252586 | A1* | 10/2012 | Takikawa | F16F 15/12366 464/68.8 |
| 2012/0252587 | A1* | 10/2012 | Takikawa | F16F 15/12366 464/68.8 |
| 2014/0251746 | A1* | 9/2014 | Ito | F16D 13/52 192/70.11 |
| 2016/0195157 | A1* | 7/2016 | Takikawa | F16D 3/12 60/330 |

* cited by examiner

*Primary Examiner* — Richard M Lorence
*Assistant Examiner* — Aimee Tran Nguyen

(57) ABSTRACT

A damper assembly for a torque converter includes: an input flange; a cover plate; an intermediate flange; a hub flange; a first spring; and second spring; and a third spring. The input flange is arranged to receive a torque. The cover plate is connected to the input flange. The intermediate flange is axially spaced from the input flange and is connected to the cover plate radially outside of the input flange. The hub flange is disposed axially between the intermediate flange and the cover plate and is arranged to connect to a transmission input shaft. The first spring is arranged to be compressed by the input flange and the cover plate. The second spring is arranged to be compressed by the cover plate and the intermediate flange. The third spring is arranged to be compressed by the intermediate flange and the hub flange.

17 Claims, 6 Drawing Sheets

TORQUE CONVERTER DAMPER ASSEMBLY

TECHNICAL FIELD

The present disclosure relates generally to a torque converter, and more specifically to a damper assembly and a torque converter including the damper assembly.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. In some torque converter arrangements, the torque converter may include a damper assembly having springs arranged in series. In such arrangements, a capacity of the damper assembly may be limited due to limited spacing within the torque converter envelope. It is desirable to have alternative designs and configurations to fit all the necessary components within the torque converter while still meeting durability and performance requirements.

SUMMARY

Embodiments disclosed herein provide a damper assembly for a torque converter including: an input flange; a cover plate; an intermediate flange; a hub flange; a first spring; and second spring; and a third spring. The input flange is arranged to receive a torque. The cover plate is connected to the input flange. The intermediate flange is axially spaced from the input flange and is connected to the cover plate radially outside of the input flange. The hub flange is disposed axially between the intermediate flange and the cover plate and is arranged to connect to a transmission input shaft. The first spring is arranged to be compressed by the input flange and the cover plate. The second spring is arranged to be compressed by the cover plate and the intermediate flange. The third spring is arranged to be compressed by the intermediate flange and the hub flange.

In embodiments, the third spring may be circumferentially aligned with the first spring. The third spring may be circumferentially spaced from the first spring. In embodiments, the second spring may be disposed radially outside of the first and third springs. A portion of the second spring may be radially aligned with the first spring. In embodiments, the input flange may be disposed between the cover plate and the intermediate flange.

Embodiments disclosed herein further provide a torque converter includes: a front cover arranged to receive a torque; a lock-up clutch engageable with the front cover; and a damper assembly engaged with the lock-up clutch. The damper assembly includes an input flange arranged to receive the torque from the front cover via the lock-up clutch. The damper assembly further includes a cover plate connected to the input flange. The damper assembly further includes an intermediate flange axially spaced from the input flange and connected to the cover plate radially outside of the input flange. The damper assembly further includes a hub flange disposed axially between the intermediate flange and the cover plate and arranged to connect to a transmission input shaft. The damper assembly further includes a first spring arranged to be compressed by the input flange and the cover plate. The damper assembly further includes a second spring arranged to be compressed by the cover plate and the intermediate flange. The damper assembly further includes a third spring arranged to be compressed by the intermediate flange and the hub flange.

In embodiments, the second spring may be radially offset relative to the third spring. In embodiments, a portion of the second spring may be radially aligned with the first spring. In embodiments, the third spring may be circumferentially spaced from the first spring. In embodiments, the third spring may be circumferentially aligned with the first spring.

In embodiments, the second spring may be disposed radially outside of the first and third springs. Aa portion of the second spring may be radially aligned with the first spring. In embodiments, the input flange may be disposed between the cover plate and the intermediate flange.

Embodiments disclosed herein further provide a method for operating a damper assembly. The damper assembly includes: an input flange arranged to receive a torque; a cover plate connected to the input flange; an intermediate flange axially spaced from the input flange and connected to the cover plate radially outside of the input flange; a hub flange disposed axially between the intermediate flange and the cover plate and arranged to connect to a transmission input shaft; a first spring directly engaged with the input flange and the cover plate; a second spring directly engaged with the cover plate and the intermediate flange; and a third spring directly engaged with the intermediate flange and the hub flange. The method includes providing the torque to the input flange. The method further includes compressing the first spring against the cover plate via the input flange. The method further includes rotating the cover plate via transmission of the torque through the first spring. The method further includes compressing the second spring against the intermediate flange via the cover plate. The method further includes rotating the intermediate flange via transmission of the torque through the second spring. The method further includes compressing the third spring against the hub flange via the intermediate flange. The method further includes rotating the hub flange via transmission of the torque through the third spring.

In embodiments, the third spring may be circumferentially aligned with the first spring. The third spring may be circumferentially spaced from the first spring.

In embodiments, the second spring may be disposed radially outside of the first and third springs. A portion of the second spring may be radially aligned with the first spring.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
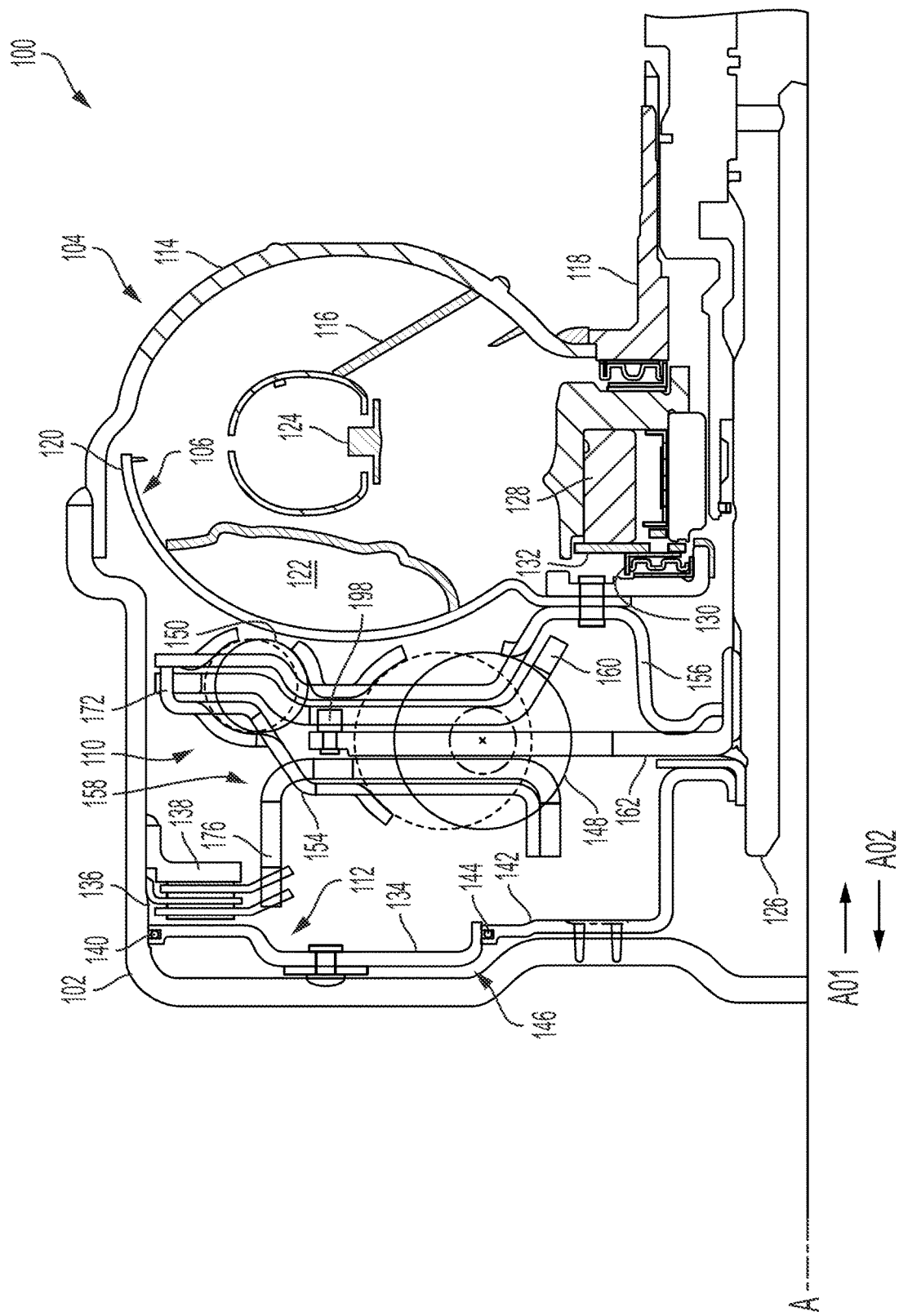
FIG. 1 illustrates a cross-sectional view of a torque converter according to an exemplary embodiment of the present disclosure.
Figure 2:
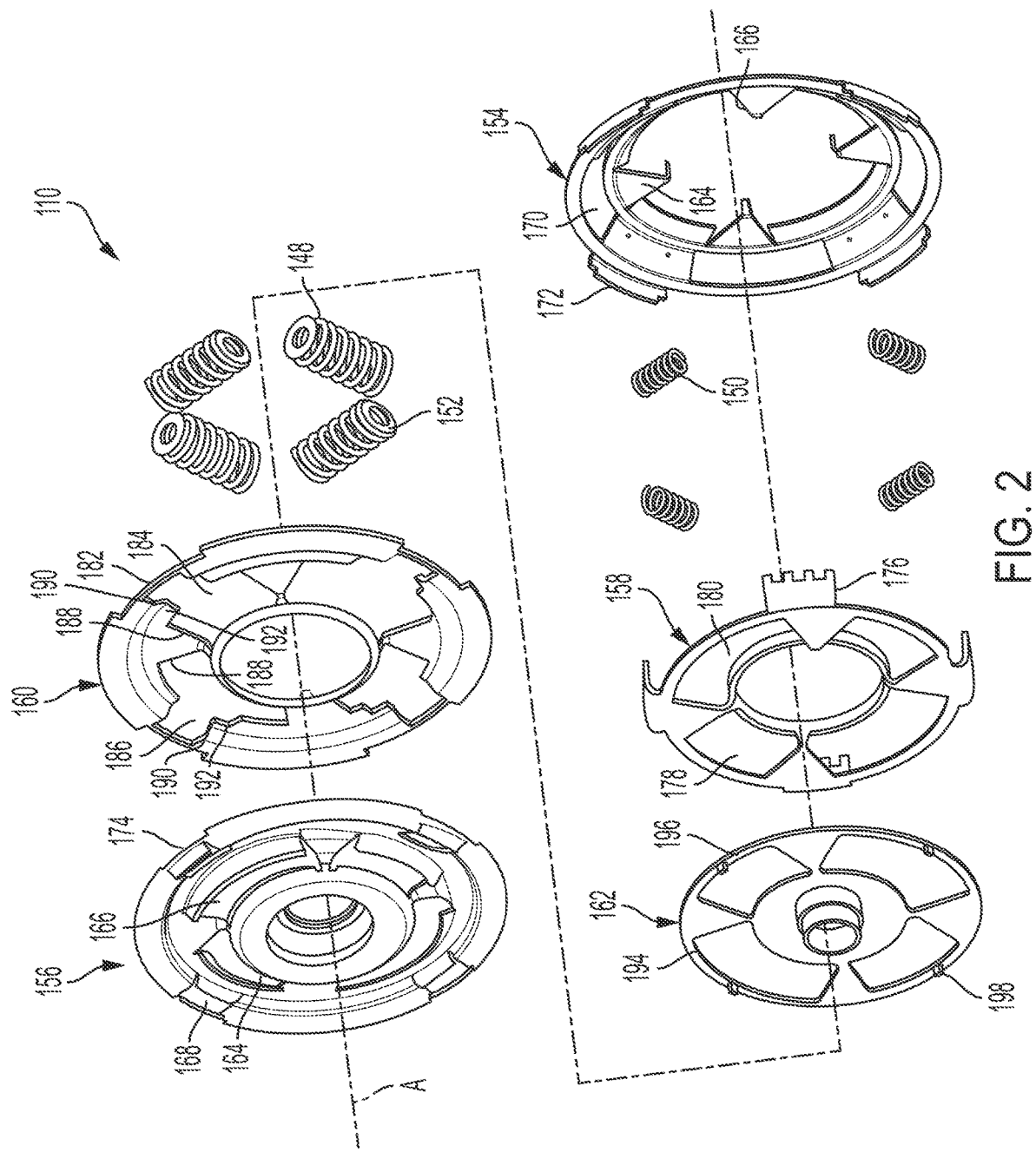
FIG. 2 illustrates an exploded view of a damper assembly according to the exemplary embodiment of the present disclosure.

Referring to FIG. 1, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 110; and a lock-up clutch assembly 112. The impeller assembly 104 includes: an impeller shell 114 non-rotatably connected to the front cover 102; at least one impeller blade 116 attached to an inner surface of the impeller shell 114; and an impeller hub 118 fixed to a radially inner end of the impeller shell 114. The turbine assembly 106 includes: a turbine shell 120; and at least one turbine blade 122 attached to the turbine shell 120. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a stator 124 disposed axially between the impeller assembly 104 and the turbine assembly 106 to redirect fluid flowing from the turbine blade 122 before the fluid reaches the impeller assembly 104 to increase an efficiency of the torque converter 100. For example, the impeller blade 116, when rotated about the central axis A, pushes the fluid outwardly. The fluid pushes against the turbine assembly 106 of the torque converter 100, causing the turbine assembly 106 to revolve about the central axis A. The stator 124 functions to return the fluid from the turbine assembly 106 back to the impeller assembly 104 with minimal or no power loss. Drive power is transmitted from the turbine assembly 106 to a transmission input shaft 126. The torque converter 100 may, for example, further include: a one-way clutch 128 disposed within the stator 124, a thrust bearing 130 disposed axially between the stator 124 and the impeller shell 114, and a side plate 132 configured to retain the one-way clutch 128 within the stator 124.

The lock-up clutch assembly 112 is configured to selectively transfer torque from the front cover 102 to the transmission input shaft 126. The lock-up clutch assembly 112 includes: a piston 134, a clutch plate 136, a reaction plate 138, and a seal plate 142. The reaction plate 138 may be fixed to the front cover 102 via a weld, for example.

The clutch plate 136 is disposed between the reaction plate 138 and the piston 134 and connected to the damper assembly 110, e.g., via a tabbed connection. The piston 134 is axially slidable to compress the clutch plate 136 against the reaction plate 138. The piston 134 may be disposed axially between the front cover 102 and the clutch plate 136 and configured to be sealed to the front cover 102 at an outer end thereof via a seal 140 and sealed to the seal plate 142 at an inner end thereof via a seal 144. The piston 134 may further be connected to the front cover 102 via a leaf-spring connection that allows axial displacement of the piston 134 in a first axial direction AD1 and a second axial direction AD2 for selective engagement of the lock-up clutch assembly 112.

The seal plate 142 may be fixed to the front cover 102, e.g., via a welded connection, radially inside of the piston 134. The seal plate 142 may be further connected to the transmission input shaft 126.

During axial movement of the piston 134, the piston 134 slides along the hub seal plate 142. The piston 134 closes the lock-up clutch assembly 112 in response to pressurization of a medium (e.g., fluid such as oil) in a piston apply chamber 146 defined between the front cover 102 and the piston 134. Seals 140, 144 maintain a fluid separation between the piston apply chamber 146 and the rest of the torque converter 100. The piston apply chamber 146 is further defined by, or bounded between, the front cover 102, the seal plate 142, the seal 140, the piston 134, and the seal 144. By "bounded in part," we mean that a portion of the cited chamber, flow path, or other structure is bounded, or formed, by the cited element.

The damper assembly 110 is positioned axially between the front cover 102 and the turbine assembly 106 and is configured to transfer torque from the front cover 102 to the transmission input shaft 126. The damper assembly 110 includes: a first spring 148, a second spring 150, a third spring 152, cover plates 154, 156, an input flange 158, an intermediate flange 160, and a hub flange 162.

The first spring 148 and the third spring 152 may be circumferentially aligned with each other. That is, a line extending about the central axis A may pass through, in order, the first spring 148 then the third spring 152. The first spring 148 and the third spring 152 may be circumferentially spaced from each other.

The second spring 150 may be disposed radially outside of the first spring 148 and the third spring 152. The second spring 150 may be radially offset relative to the third spring 152. That is, a line extending perpendicular to the central axis A from the central axis A may pass through the third spring 152 but may not pass through the second spring 150. At least a portion of the second spring 150 may be radially aligned with the first spring 148. That is, one line extending perpendicular to the central axis A from the central axis A may pass, in order through the first spring 148 then the second spring 150, and another line extending perpendicular to the central axis A from the central axis A may pass through the first spring 148 but may not pass through the second spring 150.

The second spring 150 may have a different spring rate than the first spring 148 and/or the third spring 152. For example, the spring rate of the second spring 150 may be greater than the spring rate of the first spring 148 and/or the third spring 152. The spring rate of the third spring 152 may, for example, be equal to the spring rate of the first spring 148.

The cover plate 154 may support the springs 148, 150, 152 on one axial side. The cover plate 156 may support the springs 148, 150, 152 on another, opposite axial side. The cover plates 154, 156 may be connected to each other, for example, via a tabbed connection (as discussed further below), radially outward of springs 148, 150, 152. The cover plate 156 may be connected to the turbine shell 120, e.g., via a riveted connection.

The cover plates 154, 156 may be engaged with the springs 148, 150, 152 to transmit torque through the damper assembly 110, as discussed further below. The cover plates 154, 156 may define a first inner spring window 164, a second inner spring window 166, and an outer spring window 168 disposed radially outside of the inner spring windows 164, 166. The inner spring windows 164, 166 may be circumferentially aligned with each other and circumferentially spaced from each other. The first inner spring window 164 may be configured to receive the first spring 148. The first inner spring window 164 may be further configured to compress the first spring 148 when the cover plate 154 rotates about the central axis A. That is, the cover plate 154 may be directly engaged with the first spring 148 via the first inner spring window 164.

The second inner spring window 166 may be configured to receive the third spring 152. The second inner spring window 166 may be further configured to permit movement of the third spring 152 about the central axis A when the cover plate 154 rotates about the central axis A. That is, the second inner spring window 166 may extend farther about the central axis A than the first inner spring window 164.

The outer spring window 168 may be configured to receive the second spring 150. The outer spring window 168 may be further configured to compress the second spring 150 when the cover plate 154 rotates about the central axis A. That is, the cover plate 154 may be directly engaged with the third spring 152 via the outer spring window 168.

The cover plate 154 may include a slot 170 disposed radially outside of the inner spring windows 164, 166. The slot 170 may extend partially circumferentially about the central axis A. At least a portion of the slot 170 may be circumferentially aligned with the outer spring window 168. The slot 170 may be circumferentially spaced from the outer spring window 168. The cover plate 154 may further include a tab 172 disposed radially outside of the slot 170. The tab 172 may extend partially circumferentially about the central axis A. At least a portion of the outer spring window 168 may be radially aligned with the tab 172. The tab 172 may extend axially towards the cover plate 156.

The cover plate 156 may include a groove 174 axially aligned with the tab 172. The groove 174 may be designed, i.e., sized and shaped, to receive the tab 172. The tab 172 may extend, at least partially, axially through the groove 174 such that the tab 172 engages sides of the groove 174. The tab 172 prevents rotation of the cover plate 154 relative to the cover plate 156. That is, interfaces between the tab 172 and the sides of the groove 174 non-rotatably connects the cover plates 154, 156 to each other.

The input flange 158 is disposed axially between the cover plates 154, 156, and specifically, between the cover plate 154 and the hub flange 162. The input flange 158 includes an extension 176 arranged on a radially outer diameter of the input flange 158. The radially outer diameter of the input flange 158 may be arranged radially inside of the outer spring window 168. The extension 176 extends through the slot 170 in the cover plate 154 towards the front cover 102. That is, the slot 170 is designed, i.e., sized and shaped, to receive the extension 176. The extension 176 is configured to engage sides of the slot 170. Upon engaging one side of the slot 170, the extension 176 prevents rotation of the input flange 158 relative to the cover plate 154. That is, an interface between the side of the slot 170 and the extension 176 non-rotatably connects the input flange 158 to the cover plate 154. The extension 176 is connected to the clutch plate 136, e.g., via a tabbed connection. That is, the input flange 158 and the cover plate 156 may be arranged to act as an input to the damper assembly 110.

The input flange 158 may be engaged with the first spring 148 to transmit torque through the damper assembly 110, as discussed further below. The input flange 158 may include a first opening 178, at least partially, axially aligned with the first inner spring window 164 and a second opening 180, at least partially, axially aligned with the second inner spring window 166. The first and second openings 178, 180 may be circumferentially aligned with each other and may be circumferentially spaced from each other. The first opening 178 may be configured to receive the first spring 148. The first opening 178 may be configured to compress the first spring 148 when the input flange 158 rotates about the central axis A. That is, the input flange 158 may be directly engaged with the first spring 148 via the first opening 178. The second opening 180 may be configured to receive the third spring 152. The second opening 180 may be configured to permit movement of the third spring 152 when the input flange 158 rotates about the central axis A.

The intermediate flange 160 is disposed axially between the cover plates 154, 156, and specifically, between the cover plate 156 and the hub flange 162. The intermediate flange 160 includes a channel 182, at least partially, axially aligned with the groove 174 of the cover plate 156. The channel 182 is designed to receive the tab 172. That is, the tab 172 extends axially across the intermediate flange 160 via the channel 182. The channel 182 may extend circumferentially farther about the central axis A than the groove 174 of the cover plate 156 such that the cover plates 154, 156 may rotate relative to the intermediate flange 160. The tab 172 may be configured to engage sides of the channel 182. Upon engaging one side of the channel 182, the tab 172 prevents rotation of the cover plate 154 relative to the intermediate flange 160. That is, an interface between the tab 172 and the side of the channel 182 non-rotatably connects the cover plate 154 to the intermediate flange 160.

The intermediate flange 160 may be engaged with the second spring 150 and the third spring 152 to transmit torque through the damper assembly 110, as discussed further below. The intermediate flange 160 may further include a first window 184 and a second window 186 circumferentially spaced from the first window 184. The second window 186 may be circumferentially aligned with the first window 184. Each window 184, 186 may include: an inner portion 188, an outer portion 190, and an intermediate portion 192. Each inner portion 188 may be, at least partially, axially aligned with one respective inner spring window 164, 166 and may be configured to receive one of the first spring 148 or the third spring 152. The inner portion 188 of the first window 184 may be further configured to permit movement of the first spring 148 about the central axis A when the intermediate flange 160 rotates about the central axis A. The inner portion 188 of the second window 186 may be further configured to compress the third spring 152 when the intermediate flange 160 rotates about the central axis A. That is, the intermediate flange 160 may be directly engaged with the third spring 152 via the second window 186.

Each outer portion 190 may be, at least partially, axially aligned with the outer spring window 168 and may be configured to receive one respective second spring 150. Each outer portion 190 may be further configured to compress the respective second spring 150 when the intermediate flange 160 rotates about the central axis A. That is, the intermediate flange 160 may be directly engaged with the second spring 150 via the outer portion 190. Each intermediate portion 192 extends radially from the respective inner portion 188 to the respective outer portion 190.

The hub flange 162 is disposed axially between the cover plates 154, 156, and specifically, between the intermediate flange 160 and the input flange 158. The hub flange 162 may be engaged with the third spring 152 to transmit torque through the damper assembly 110, as discussed further below. The hub flange 162 is connected to the transmission input shaft 126 for torque transmission therebetween.

The hub flange 162 may include a first hole 194 and a second hole 196 circumferentially spaced from the first hole 194. The first hole 194 may be circumferentially aligned with the second hole 196. The first hole 194 may be, at least partially, axially aligned with the first inner spring window 164 and may be configured to receive the first spring 148. The first hole 194 may be configured to permit movement of the first spring 148 when the hub flange 162 rotates about the central axis A. The second hole 196 may be, at least partially, axially aligned with the second inner spring window 166 and may be configured to receive the third spring 152. The second hole 196 may be configured to compress the third spring 152 when the hub flange 162 rotates about the central axis A. That is, the hub flange 162 may be directly engaged with the third spring 152 via the second hole 196.

The hub flange 162 may further include a plurality of stoppers 198 arranged radially outside of the holes 194, 196. Each stopper 198 may be radially aligned with one respective hole 194, 196. Each stopper 198 may be configured to engage sides of one respective intermediate portion 192 of corresponding windows 184, 186. That is, each stopper 198 may extend axially across the intermediate flange 160 via the intermediate portion 192 of one respective window 184, 186. Upon engaging one side of the intermediate portion 192, the stoppers 198 prevent rotation of the intermediate flange 160 relative to the hub flange 162. That is, an interface between the stoppers 198 and the corresponding sides of the respective intermediate portions 192 non-rotatably connects the intermediate flange 160 to the hub flange 162.

Figure 3A:
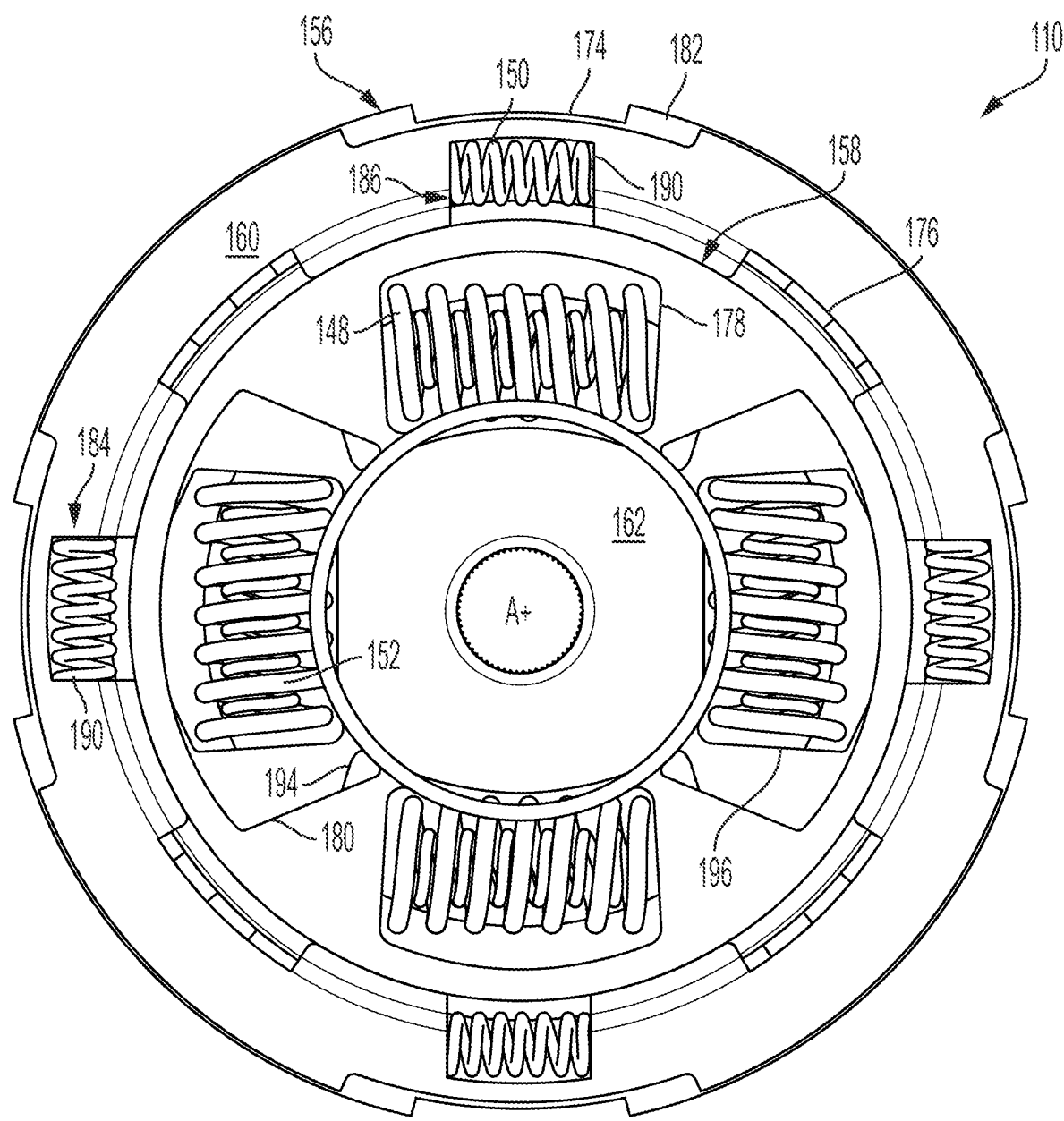
FIG. 3A illustrates a side view of the damper assembly shown in FIG. 1 with a cover plate removed and when the damper assembly is not subjected to a torque.
Figure 3B:
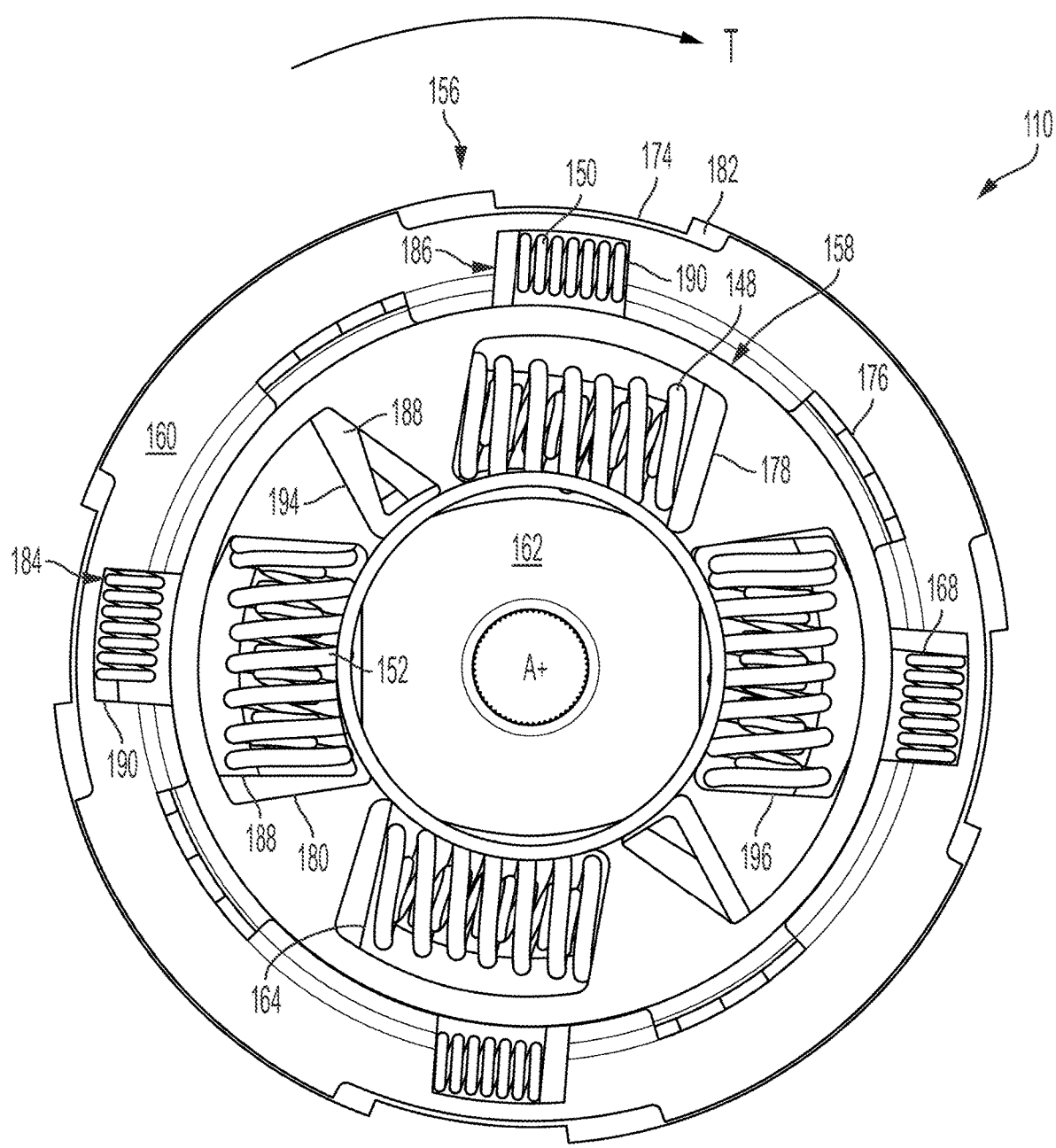
FIGS. 3B-3D illustrate a side view of the damper assembly shown in FIG. 1 with the cover plate removed and when the damper assembly is subjected to a torque.
Figure 3C:
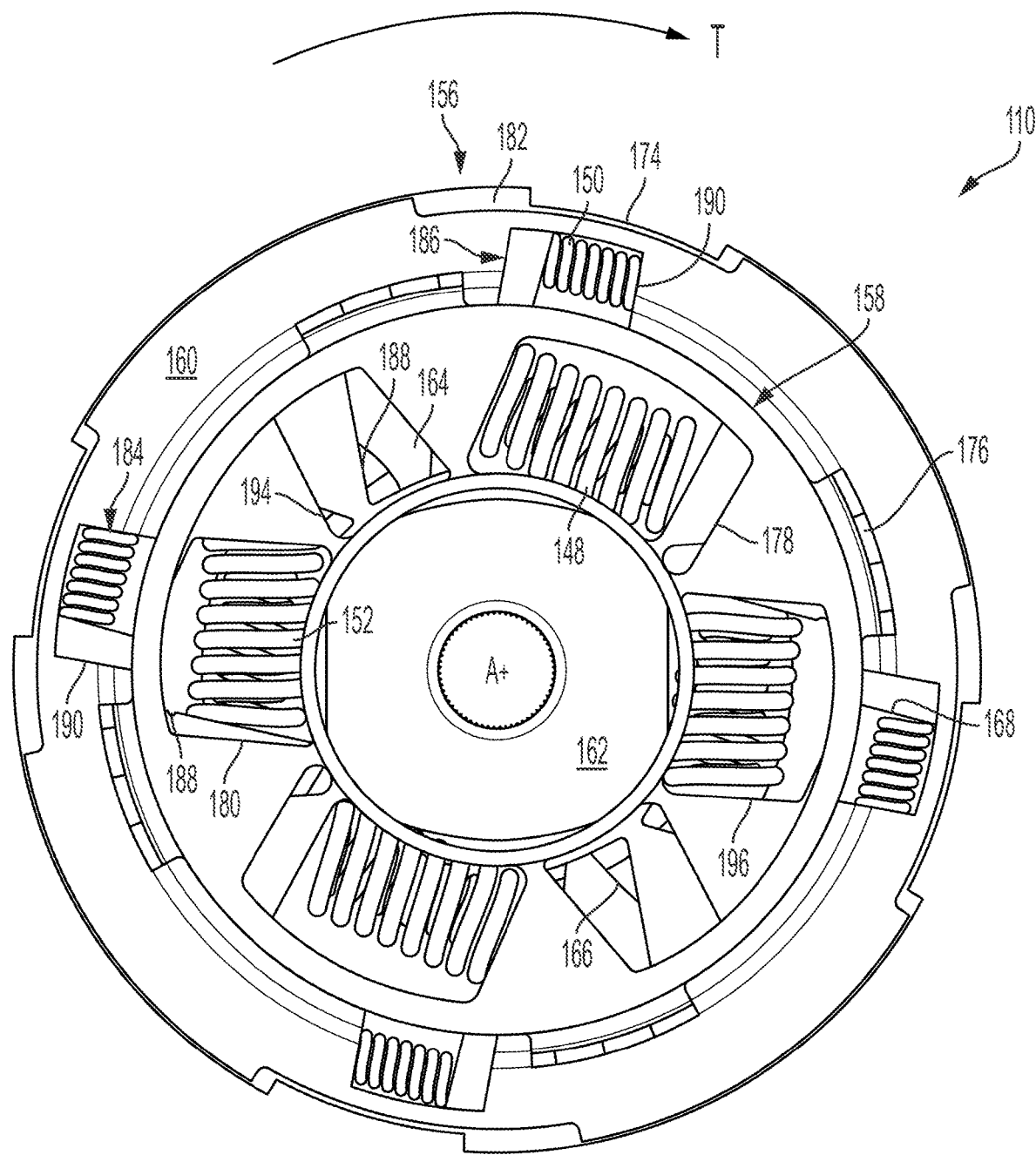
Figure 3D:
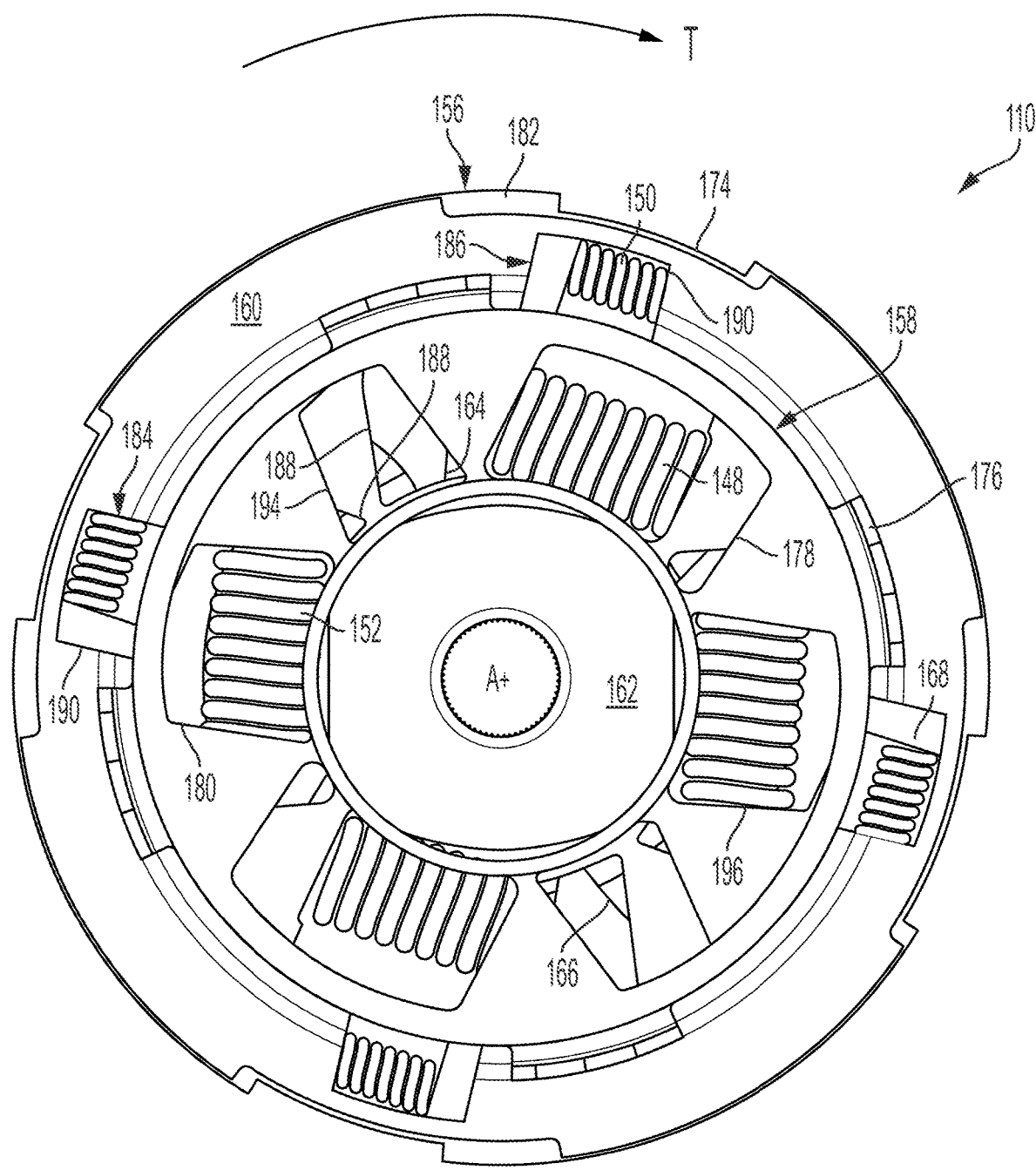

The following should be viewed in light of FIGS. 1-3D. The following describes an exemplary method of operating the damper assembly 110 to transmit a torque T to the transmission input shaft 126. However, it is to be understood that the method may include fewer steps and/or the steps may be executed in a different order. A first step provides the torque T to the input flange 158, e.g., via the lock-up clutch assembly 112. A second step rotates the input flange 158. A third step compresses the first spring 148 between the cover plate 156 and the input flange 158, as shown in FIG. 3B. A fourth step transmits, via the first spring 148, the torque T from the input flange 158 to the cover plate 156. A fifth step contacts, with the extension 176, the side of the slot 170 to prevent further compression of the first spring 148. A sixth step rotates the cover plate 156. A seventh step compresses the second spring 150 between the cover plate 156 and the intermediate flange 160, as shown in FIG. 3C. An eighth step transmits, via the second spring 150, the torque T from the cover plate 156 to the intermediate flange 160. A ninth step contacts, with the tab 172, one side of the channel 182 to prevent further compression of the second spring 150. A tenth step rotates the intermediate flange 160. An eleventh step compresses the third spring 152 between the intermediate flange 160 and the hub flange 162, as shown in FIG. 3D. A twelfth step transmits, via the third spring 152, the torque T from the intermediate flange 160 to the hub flange 162. A thirteenth step contacts, with the stopper 198, one side of the intermediate portion 192 to prevent further compression of the third spring 152. A fourteenth step rotates the hub flange 162. A fifteenth step transmits the torque from the hub flange 162 to the transmission input shaft 126.

Embodiments according to the present disclosure provide various advantages including providing an intermediate spring radially outside of a set of in-line springs, which can increase capacity of the damper assembly within a limited torque converter envelope.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
110 damper assembly
112 lock-up clutch assembly
114 impeller shell
116 impeller blade
118 impeller hub
120 turbine shell
122 turbine blade
124 stator 126 transmission input shaft
128 one-way clutch
130 bearing
132 side plate
134 piston
136 clutch plate
138 reaction plate
140 seal
142 seal plate
144 seal
146 apply chamber
148 spring
150 spring
152 spring
154 cover plate
156 cover plate
158 input flange
160 intermediate flange
162 hub flange
164 inner spring window
166 inner spring window
168 outer spring window
170 slot
172 tab
174 groove
176 extension
178 opening
180 opening
182 channel
184 window
186 window
188 inner portion
190 outer portion
192 intermediate portion
194 hole
196 hole
198 stopper
A central axis
AD1 axial direction
AD2 axial direction
T torque

What is claimed is:

1. A damper assembly for a torque converter, comprising:
an input flange arranged to receive a torque;
a cover plate connected to the input flange;
an intermediate flange axially spaced from the input flange and connected to the cover plate radially outside of the input flange;
a hub flange disposed axially between the intermediate flange and the cover plate and arranged to connect to a transmission input shaft;
a first spring arranged to be compressed by the input flange and the cover plate;
a second spring arranged to be compressed by the cover plate and the intermediate flange; and
a third spring arranged to be compressed by the intermediate flange and the hub flange;
wherein the second spring is disposed radially outside of the first and third springs.

2. The damper assembly of claim 1, wherein the third spring is circumferentially aligned with the first spring.

3. The damper assembly of claim 2, wherein the third spring is circumferentially spaced from the first spring.

4. The damper assembly of claim 1, wherein a portion of the second spring is radially aligned with the first spring.

5. The damper assembly of claim 1, wherein the input flange is disposed between the cover plate and the intermediate flange.

6. A torque converter, comprising:
a front cover arranged to receive a torque;
a lock-up clutch engageable with the front cover; and
a damper assembly engaged with the lock-up clutch, the damper assembly including:
an input flange arranged to receive the torque from the front cover via the lock-up clutch;
a cover plate connected to the input flange;
an intermediate flange axially spaced from the input flange and connected to the cover plate radially outside of the input flange;
a hub flange disposed axially between the intermediate flange and the cover plate and arranged to connect to a transmission input shaft;
a first spring arranged to be compressed by the input flange and the cover plate;
a second spring arranged to be compressed by the cover plate and the intermediate flange; and
a third spring arranged to be compressed by the intermediate flange and the hub flange;
wherein the third spring is circumferentially spaced from the first spring.

7. The torque converter of claim 6, wherein the second spring is radially offset relative to the third spring.

8. The torque converter of claim 6, wherein a portion of the second spring is radially aligned with the first spring.

9. The torque converter of claim 6, wherein the third spring is circumferentially aligned with the first spring.

10. The torque converter of claim 9, wherein the third spring is circumferentially spaced from the first spring.

11. The torque converter of claim 6, wherein the second spring is disposed radially outside of the first and third springs.

12. The torque converter of claim 11, wherein a portion of the second spring is radially aligned with the first spring.

13. The torque converter of claim 6, wherein the input flange is disposed between the cover plate and the intermediate flange.

14. A method for operating a damper assembly, the damper assembly including an input flange arranged to receive a torque, a cover plate connected to the input flange, an intermediate flange axially spaced from the input flange and connected to the cover plate radially outside of the input flange, a hub flange disposed axially between the intermediate flange and the cover plate and arranged to connect to a transmission input shaft, a first spring directly engaged with the input flange and the cover plate, a second spring directly engaged with the cover plate and the intermediate flange, and a third spring directly engaged with the intermediate flange and the hub flange, the method comprising:
providing the torque to the input flange;
compressing the first spring against the cover plate via the input flange;
rotating the cover plate via transmission of the torque through the first spring;
compressing the second spring against the intermediate flange via the cover plate;
rotating the intermediate flange via transmission of the torque through the second spring;
compressing the third spring against the hub flange via the intermediate flange; and
rotating the hub flange via transmission of the torque through the third spring;

wherein the third spring is circumferentially aligned with the first spring.

15. The method of claim 14, wherein the third spring is circumferentially spaced from the first spring.

16. The method of claim 14, wherein the second spring is disposed radially outside of the first and third springs.

17. The method of claim 16, wherein a portion of the second spring is radially aligned with the first spring.

* * * * *